US009664215B2

(12) United States Patent
Laird et al.

(10) Patent No.: US 9,664,215 B2
(45) Date of Patent: May 30, 2017

(54) REMOVABLE COMPACT HINGE AND METHOD OF USE

(71) Applicant: Hardware Resources, Inc., Bossier City, LA (US)

(72) Inventors: Rachel Laird, Dallas, TX (US); Travis McElveen, Bossier City, LA (US); Dennis McGregor, Dallas, TX (US)

(73) Assignee: HARDWARE RESOURCES, INC., Bossier City, LA (US)

( * ) Notice: Subject to any disclaimer, the term of this patent is extended or adjusted under 35 U.S.C. 154(b) by 0 days.

(21) Appl. No.: 14/947,481

(22) Filed: Nov. 20, 2015

(65) Prior Publication Data

US 2016/0145921 A1 May 26, 2016

Related U.S. Application Data

(60) Provisional application No. 62/082,500, filed on Nov. 20, 2014.

(51) Int. Cl.
*E05D 7/04* (2006.01)
*F16B 2/12* (2006.01)
(Continued)

(52) U.S. Cl.
CPC .................. *F16B 2/12* (2013.01); *E05D 5/08* (2013.01); *E05D 7/0415* (2013.01); *E05D 7/123* (2013.01);
(Continued)

(58) Field of Classification Search
CPC . Y10T 16/554; Y10T 16/534; Y10T 16/5358; Y10T 16/5321; Y10T 16/53225; Y10T 16/53253; F16B 2/12; F16B 2/18; F16B 2/185; E05D 5/0276; E05D 5/06; E05D 5/065; E05D 5/08; E05D 7/0415; E05D 7/123; E05D 7/12; E05D 7/125; E05D 7/04; E05D 7/0407; E05D 7/0423;
(Continued)

(56) References Cited

U.S. PATENT DOCUMENTS

| 1,124,048 | A | * | 1/1915 | Malaspina | ............. B65D 85/12 |
| | | | | | 16/249 |
| 1,145,521 | A | * | 7/1915 | Stock | .................... E05D 5/0246 |
| | | | | | 16/252 |

(Continued)

*Primary Examiner* — Chuck Mah
(74) *Attorney, Agent, or Firm* — Schultz & Associates, P.C.

(57) ABSTRACT

Disclosed is a removable compact hinge for pivotal connection between a furniture piece and a door. The apparatus incorporates a clamping attachment mechanism in order to avoid permanent mounting holes and to provide quick installation and adjustable installation location. The apparatus comprises a hinge cup pivotally connected to an attachment mechanism ion with a hinge arm. The attachment mechanism comprises a base slidably engaged with a sliding body, the sliding body including an adjustable pressure plate. A lever works with a set of links to slide the sliding body with respect to the base towards the furniture piece and mechanically and releasably clamp the attachment mechanism to the furniture piece without the use of typical wood screws thereby preserving the integrity of the furniture piece. The apparatus further includes adjustability in the vertical, horizontal, and lateral directions.

21 Claims, 11 Drawing Sheets

(51) Int. Cl.
*F16B 2/18* (2006.01)
*E05D 5/08* (2006.01)
*E05D 7/12* (2006.01)
*E05D 5/06* (2006.01)

(52) U.S. Cl.
CPC .............. *F16B 2/185* (2013.01); *E05D 5/065* (2013.01); *E05Y 2600/502* (2013.01); *E05Y 2600/51* (2013.01); *E05Y 2600/626* (2013.01); *E05Y 2800/178* (2013.01); *E05Y 2900/20* (2013.01)

(58) Field of Classification Search
CPC ....... E05D 2007/0492; E05Y 2600/502; E05Y 2600/51; E05Y 2600/626; E05Y 2800/178; E05Y 2900/20
See application file for complete search history.

(56) References Cited

U.S. PATENT DOCUMENTS

| | | | | |
|---|---|---|---|---|
| 1,422,651 A * | 7/1922 | Baxter | .................. | E05D 7/1061 16/252 |
| 3,710,415 A * | 1/1973 | Wilson | ................ | E05D 11/1014 16/382 |
| 4,141,110 A * | 2/1979 | Wanek | .................... | E05D 5/065 16/252 |
| 4,361,931 A * | 12/1982 | Schnelle | ................... | E05D 5/08 16/252 |
| 5,463,796 A * | 11/1995 | Brustle | ..................... | E05D 5/08 16/383 |
| 5,577,297 A * | 11/1996 | Lautenschlager | ......... | E05D 5/08 16/254 |
| 5,613,796 A * | 3/1997 | Salice | ...................... | E05D 5/08 292/34 |
| 5,715,577 A * | 2/1998 | Lautenschlager | ......... | E05D 5/08 16/383 |
| 6,279,200 B1 * | 8/2001 | Ferrari | .................... | E05D 7/125 16/332 |
| 6,286,186 B1 * | 9/2001 | Lautenschlager | ...... | A47B 95/00 16/258 |
| 6,314,616 B1 * | 11/2001 | King | ....................... | E05D 3/022 16/237 |
| 6,361,241 B1 * | 3/2002 | Ferrari | ..................... | E05D 5/08 403/279 |
| 6,547,477 B1 * | 4/2003 | Huber | ................. | F16B 12/2009 403/231 |
| 6,557,959 B1 * | 5/2003 | King | ....................... | E05D 3/022 16/335 |
| 7,213,300 B1 * | 5/2007 | Domenig | ................. | E05D 7/04 16/236 |
| 7,509,708 B1 * | 3/2009 | Radke | .................... | E05D 7/0415 16/237 |
| 8,006,348 B2 * | 8/2011 | Ferrari | ..................... | E05D 5/08 16/383 |
| 8,683,652 B2 * | 4/2014 | Hagspiel | ............... | E05D 7/0407 16/236 |
| 2008/0016648 A1* | 1/2008 | Lautenschlager | ..... | E05D 7/0415 16/238 |
| 2011/0083299 A1* | 4/2011 | Krudener | ............. | E05D 7/0407 16/319 |
| 2012/0195708 A1* | 8/2012 | Raich | .................... | A47B 95/00 411/54 |
| 2014/0359973 A1* | 12/2014 | Ng | ........................... | E05D 7/00 16/225 |
| 2015/0240543 A1* | 8/2015 | Ng | ........................ | E05D 7/0407 16/233 |

* cited by examiner

US 9,664,215 B2

REMOVABLE COMPACT HINGE AND METHOD OF USE

CROSS-REFERENCE TO RELATED APPLICATIONS

This application claims the benefit of U.S. Provisional Patent Application No. 62/082,500 filed on Nov. 20, 2014, the contents of which are incorporated herein by reference.

FIELD OF THE DISCLOSURE

The present disclosure relates to hinge mechanisms for connecting a cabinet door to a cabinet carcass. In particular, the disclosure relates to a removable compact hinge capable of quick installation and repositioning without the need for typical connection hardware.

BACKGROUND OF THE DISCLOSURE

In the typical hinged connection between a cabinet door and a cabinet carcass, a hinge mechanism will include a hinge cup pivotally connected to a hinge body by a hinge arm. A common configuration positions the hinge cup in a custom bore in the cabinet door. The hinge body is mounted to the cabinet carcass either directly or through the use of a mounting plate. Mounting screws are typically used to mount the hinge cup to the door and the hinge body or mounting plate to the cabinet carcass. Wood screws leave permanent holes in the wood and are very difficult to reposition accurately. In many situations, such as refacing kitchen cabinets, functional hardware must be replaced and repositioned which the permanent holes make difficult.

Therefore, there is a need for a hinge between a cabinet door and a cabinet carcass that can be repositioned easily without damaging the cabinet carcass or the cabinet door. A need also exists for a hinge that is quickly removable to aid in the installation and manufacturing processes.

SUMMARY OF THE DISCLOSURE

In a preferred embodiment, a removable compact hinge is comprised of a hinge arm pivotally connecting a hinge cup to an attachment mechanism. The attachment mechanism is removably mounted to a cabinet carcass by a clamping mechanism without the use of traditional mounting hardware such as wood screws. The attachment mechanism can be removed from and repositioned on the cabinet without creating permanent screw holes.

The attachment mechanism comprises a base adjacent to a cabinet carcass. The base includes a set of flanges extending from a body and a hole in the body for attachment to the hinge arm. A set of rails and a set of extensions with pivot holes extend from the body. The attachment mechanism further comprises a dog for slidable engagement with the base. The dog comprises a set of arms extending from a transverse portion. The arms include slots and tabs for engagement with set of rails on the base. A jaw portion extends from the transverse portion and includes a threaded hole for engagement with a thumbscrew and a set of guide holes. The attachment mechanism further comprises a pressure plate. The pressure plate includes a set of posts for slidable engagement with the set of guide holes and a face with protrusions for engagement with the cabinet carcass. The face includes a centrally located hole for attachment of the thumbscrew. The attachment mechanism further comprises a lever pivotally attached to the base and a set of links. The links are further pivotally attached to the dog.

An adjustment plate connected between the hinge arm and the base of the attachment mechanism cooperates with a vertical adjustment cam, a lateral adjustment screw, and a horizontal adjustment cam to provide adjustability of the removable compact hinge in three directions. The vertical adjustment cam connects the hinge arm and the adjustment plate to the attachment mechanism and provides vertical movement of the hinge arm relative to the attachment mechanism. The lateral adjustment screw connects the hinge arm to the adjustment plate and provides lateral movement of the hinge arm relative to the adjustment plate. The horizontal adjustment cam connects the hinge arm to the adjustment plate and provides horizontal movement of the hinge arm relative to the adjustment plate.

In use the hinge cup is mounted to a cabinet door. The base is positioned on the cabinet carcass such that the body is adjacent an end face of the cabinet and the set of flanges extend around a corner. The thumbscrew is advanced in the threaded hole in the jaw portion of the dog which urges the pressure plate toward the cabinet carcass resulting in the frame of the cabinet carcass being sandwiched between the set of flanges and the pressure plate. The lever is pivoted towards a position where it is generally parallel with the base and the dog. As the lever closes, it forces the dog toward the cabinet carcass and locks the attachment mechanism in place.

BRIEF DESCRIPTION OF THE DRAWINGS

The disclosed embodiments will be described with reference to the accompanying drawings. Like parts in different drawings are referenced by the same number.

DETAILED DESCRIPTION

Figure 1A:
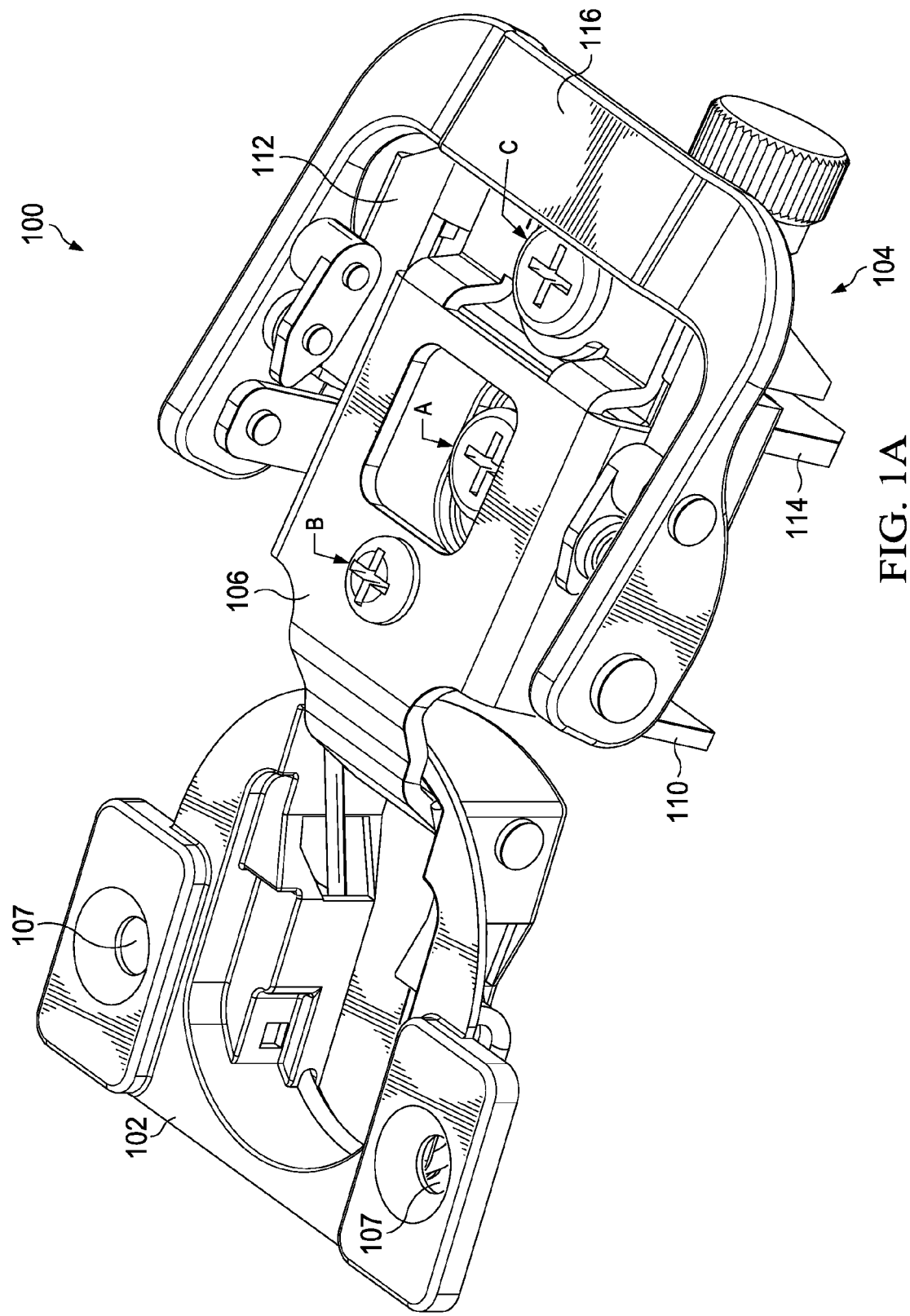
FIG. 1A is an isometric view of a preferred embodiment in a locked position.
Figure 1B:
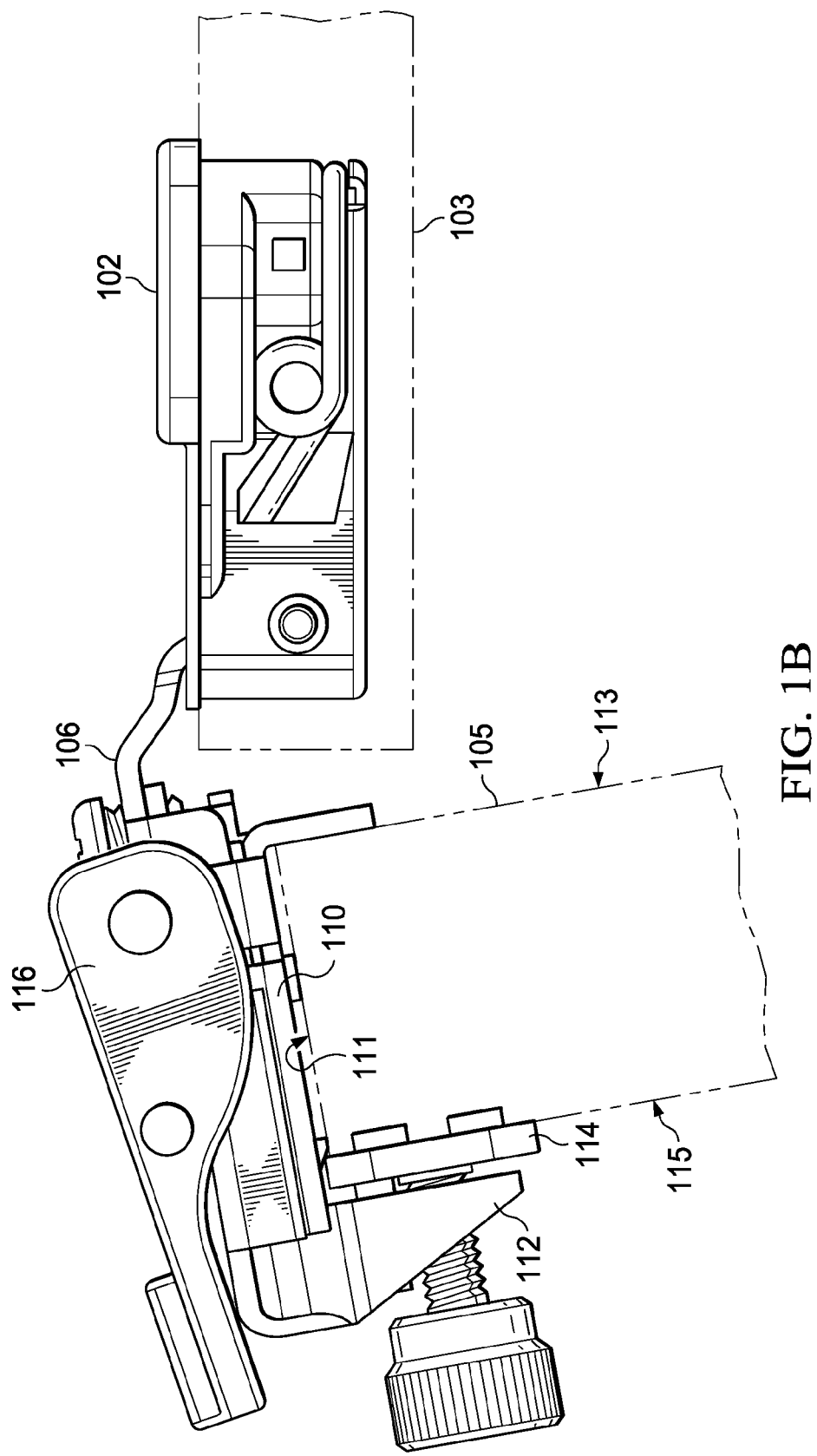
FIG. 1B is a plan view of a preferred embodiment in a locked position.
Figure 2A:
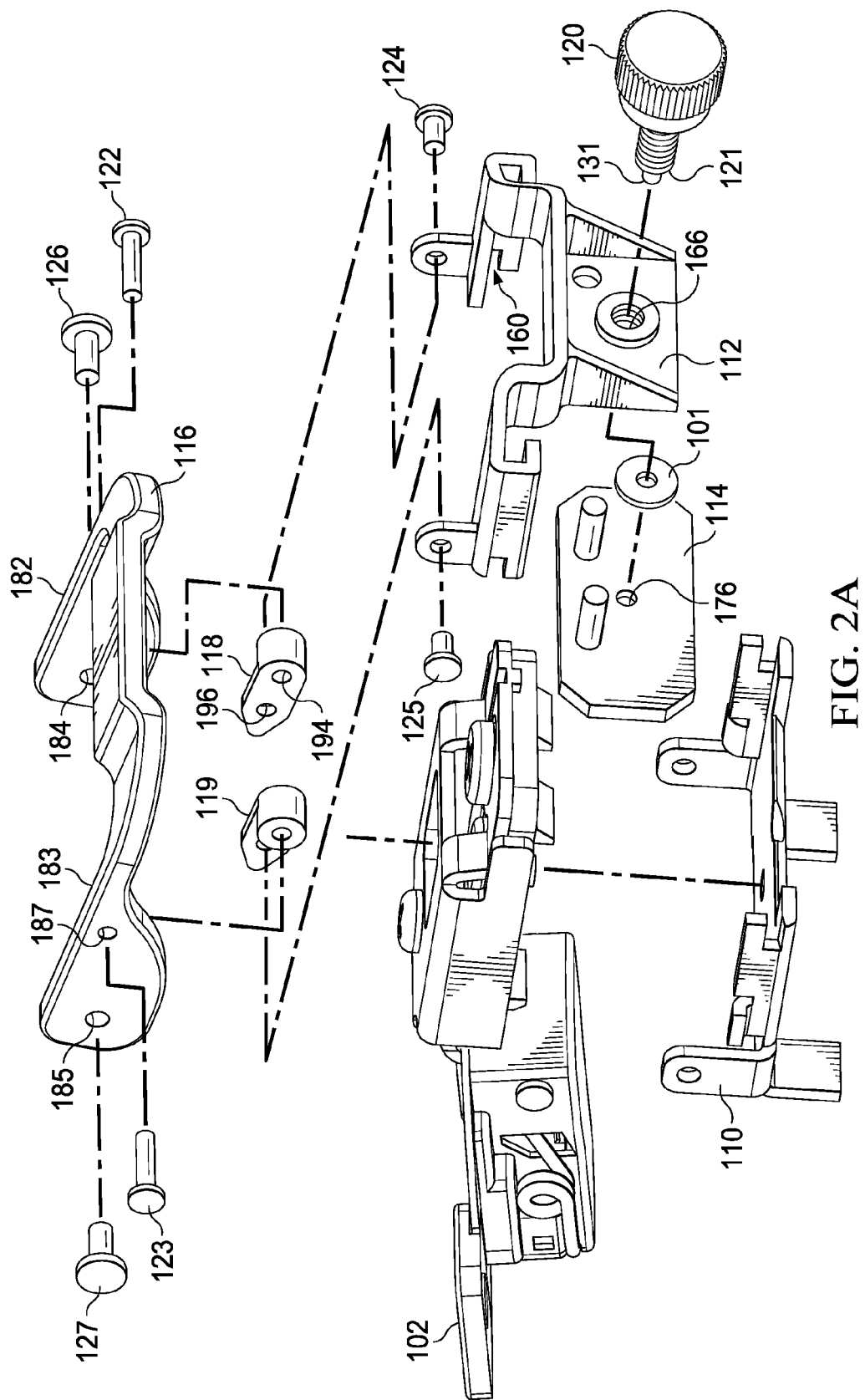
FIG. 2A is an exploded isometric view of a preferred embodiment.

Referring to FIGS. 1A, 1B and 2A, removable hinge 100 comprises hinge cup 102 pivotally connected to attachment mechanism 104 by hinge arm 106. Typically, hinge cup 102 is affixed to cabinet door 103 with screws through mounting holes 107. Attachment mechanism 104 is removably attached to cabinet carcass 105 as will be described below. Removable hinge 100 is repositionable between a "locked" position to cabinet carcass 105 and an "unlocked" position. In the locked position, the attachment mechanism is securely affixed to the cabinet carcass. In the unlocked position, the attachment mechanism can be removed from attachment to the cabinet carcass. In a preferred embodiment, the components of removable hinge 100 are typically constructed of metal such as cast aluminum or steel alloy plate stock.

Attachment mechanism 104 comprises base 110, dog 112, pressure plate 114, lever 116, and opposing links 118 and 119. Base 110 is attached to cabinet carcass 105 at faces 111 and 113. Base 110 is slidably engaged with dog 112. Thumbscrew 120 is threaded into dog 112 at hole 166. Thumbscrew 120 includes shoulder 121 which abuts washer 101. The thumbscrew also includes end rivet 131. End rivet 131 fits into mounting hole 176 in pressure plate 114 and is secured by peening during manufacture.

Pressure plate 114 includes stanchions 174 and 175 which fit into guide holes 164 and 165. The clearance level between the stanchions and the guide holes is about 1/16" and should allow for axial movement of the stanchions without binding. Lever 116 is pivotally attached to base 110 with pins 126 and 127. Lever 116 is pivotally attached to links 118 and 119 with pins 122 and 123. Links 118 and 119 are pivotally attached to dog 112 with pins 124 and 125.

Figure 2B:
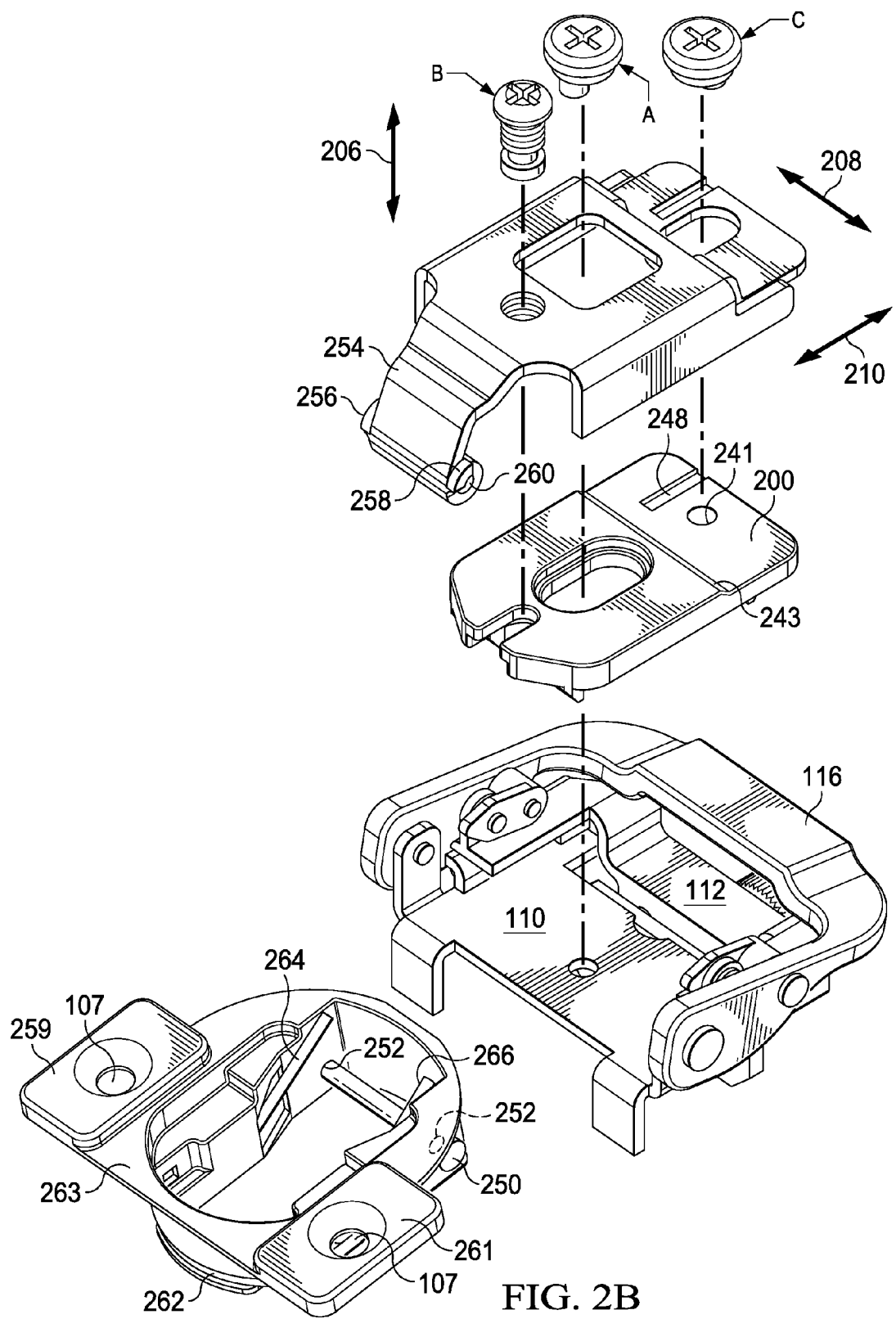
FIG. 2B is an exploded isometric view of a preferred embodiment.
Figure 2C:
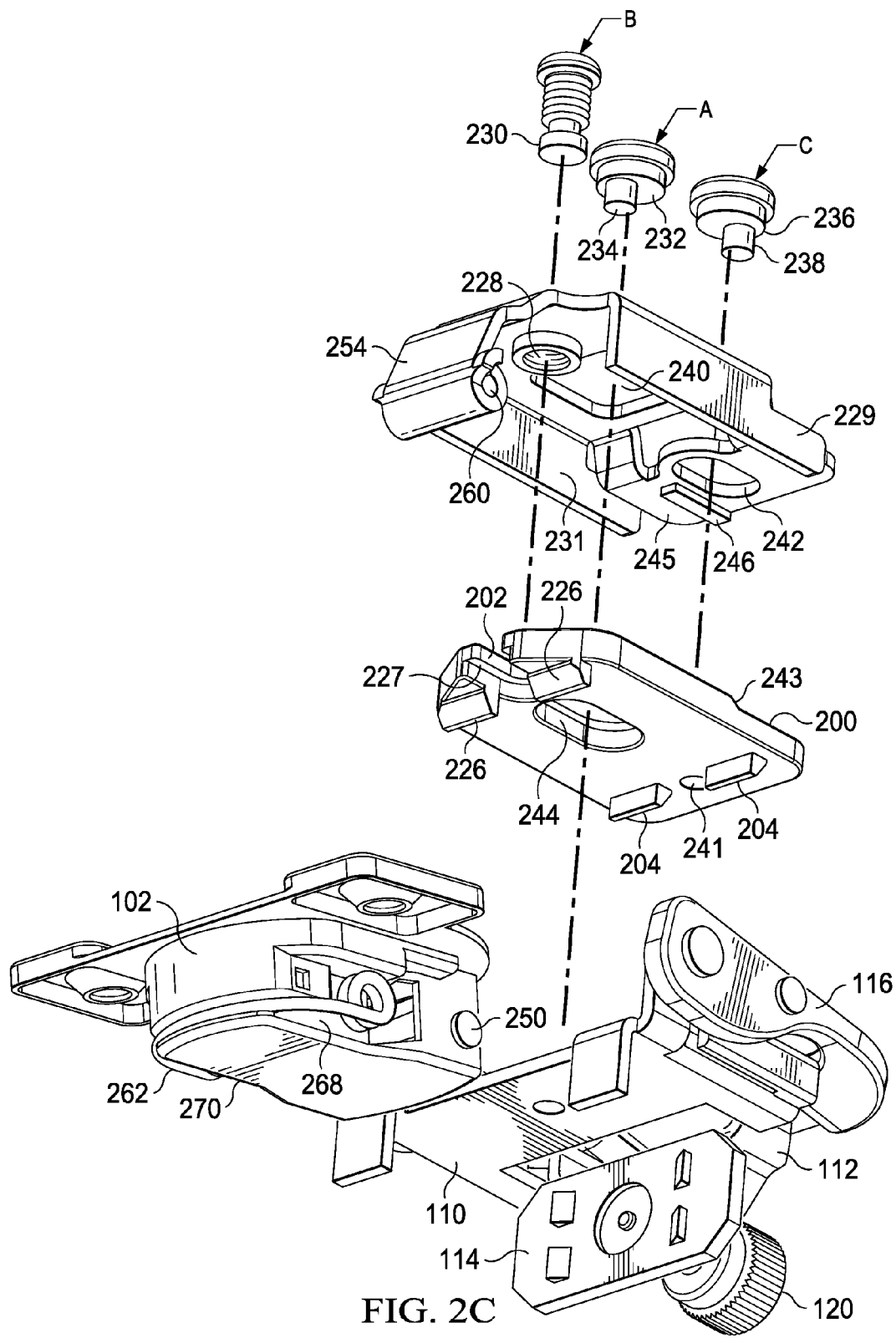
FIG. 2C is an exploded isometric view of a preferred embodiment.

Referring to FIGS. 2A, 2B, and 2C, the horizontal, vertical, and lateral adjustment mechanisms will be described. Adjustment plate 200 includes positioning extensions 204 and 226. Positioning extension 204 abuts slot 146 in base 110. Positioning extension 226 abuts slot 145 in base 110. Adjustment plate 200 includes pivot hole 241 and follower hole 244. Adjustment plate 200 also includes alignment slot 202 which is positioned between positioning extensions 226. Alignment slot 202 is open on one end and includes retaining shoulder 227. The top surface of adjustment plate 200 also includes guide slot 248.

Hinge arm 106 is generally sized to fit over and retain adjustment plate 200. Hinge arm 106 includes sides 229 and 231 which extend over adjustment plate 200. Guide rail 246 is sized to fit within guide slot 248 of adjustment plate 200. Hinge arm 106 includes threaded hole 228 for receipt of the threads of lateral adjustment screw B. Hinge arm 106 includes generally square access hole 240 and oblong follower hole 242. Hinge arm 106 also includes step down 245 which is designed to engage guide shelf 243 of adjustment plate 200.

Hinge arm 106 includes extension arm 254. Extension arm 254 is manufactured to include pivot hole 260. Pivot hole 260 is designed to engage pin 250 of hinge cup 102. Extension arm 254 includes cam surfaces 256 and 258. Cam surfaces 256 and 258 are sized to engage spring arms 264 and 266 of bias spring 262.

Lateral adjustment screw B is threaded through threaded hole 228 of the hinge arm. Head 230 of the adjustment screw fits within alignment slot 202 and engages retaining shoulder 227. Engagement of head 230 and retaining shoulder 227 restrains relative vertical movement between hinge arm 106 and adjustment plate 200, but allows horizontal movement between the two components.

Vertical adjustment cam A is sized to fit through follower hole 244 and engage pivot hole 142 in base 110. Cam shoulder 232 engages the interior surface of follower hole 244. Offset cam extension 234 is sized to fit within pivot hole 142 while allowing free rotation between the two. During manufacture, offset cam extension 234 is peened after insertion into pivot hole 142 to prevent extraction. Offset cam extension 234 is intentionally located flush with an edge of cam shoulder 232.

Horizontal adjustment cam C includes cam shoulder 236. Cam shoulder 236 is sized to fit within follower hole 242. Horizontal adjustment cam C includes offset cam extension 238. Offset cam extension 238 is sized to fit within pivot hole 241 to allow free rotation. During manufacture offset cam extension 238 is peened after insertion into pivot hole 241 to prevent extraction. Offset cam extension 238 is intentionally located flush with an edge of cam shoulder 236.

In use, lateral adjustment screw B is rotated whereby retaining head 230 moves retaining shoulder 227 and results in lateral movement, in direction 206, of hinge arm 106 relative to adjustment plate 200.

Vertical adjustment cam A is rotated in access hole 240, which results in cam shoulder 232 engaging follower hole 244. Follower hole 244 and adjustment plate 200 are moved vertically, sliding positioning extensions 226 and 204 vertically within slots 145 and 146 of base 110. The positioning extensions prevent angular movement of adjustment plate 200 and hinge arm 106 with respect to base 110. Adjustment plate 200 abuts sides 229 and 231 thereby moving hinge arm 106 with adjustment plate 200 vertically with respect to base 110, in direction 208.

Horizontal adjustment cam C is rotated whereby offset cam extension 238 rotates in pivot hole 241. Cam shoulder 236 engages follower hole 242, thereby moving hinge arm 106 horizontally with respect to adjustment plate 200 in direction 210. Alignment slot 202 allows retaining head 230 to also move horizontally with respect to adjustment plate 200. Sides 229 and 231 prevent rotational movement of hinge arm 106 with respect to adjustment plate 200.

Referring to FIGS. 1A, 2B, and 2C, the connection of hinge cup 102 to hinge arm 106 will be described. Hinge cup 102 comprises cup body 263 including coil indentions 268 and 270. Hinge cup 102 includes mounting tabs 259 and 261. Mounting tabs 259 and 261 include mounting holes 107 for securing the hinge cup to a cabinet door. Hinge cup 102 includes through hole 252 in which is positioned pin 250. Pin 250 also engages pivot hole 260 and retains extension arm 254 in the hinge cup.

Coil indentions 268 and 270 form a housing for bias spring 262. Bias spring 262 includes spring arms 264 and 266. Spring arms 264 and 266 engage cam surfaces 256 and 258 respectively. The spring arms provide a greater bias to the cam surfaces when the hinge is in a closed position than they do when the hinge is in open position.

Figure 3A:
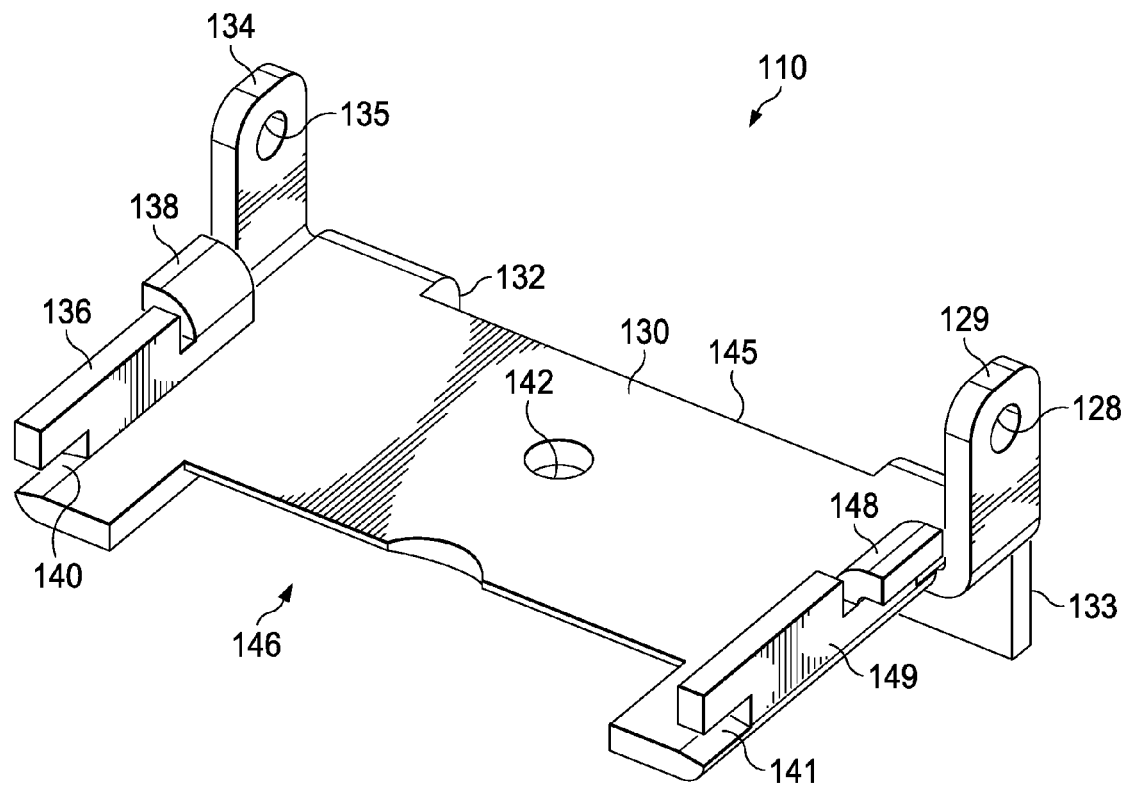
FIG. 3A is an isometric view of a base of a preferred embodiment.
Figure 3B:
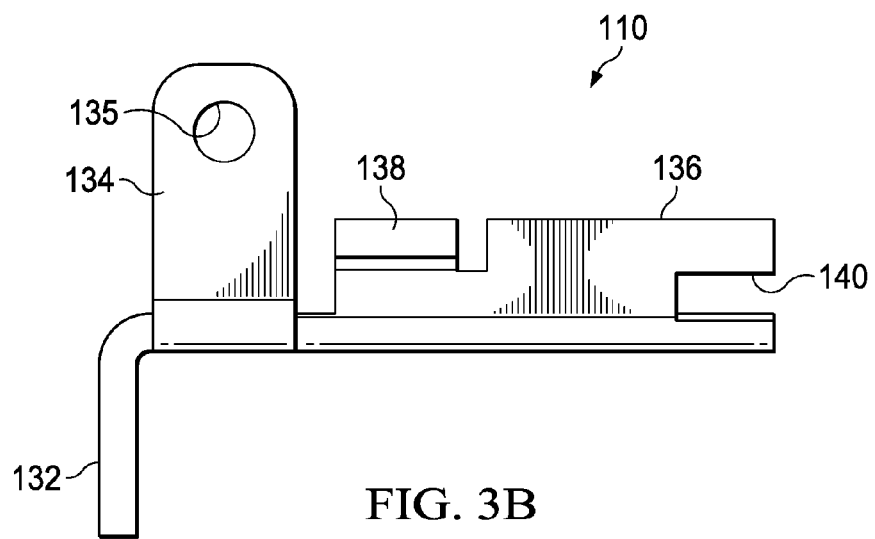
FIG. 3B is a plan view of a base of a preferred embodiment

Referring to FIGS. 3A and 3B, base 110 includes flanges 132 and 133 which extend at right angles from bridge 130. Bridge 130 includes a centrally located pivot hole 142 sized to engage adjustment cam A. A set of extensions 129 and 134 extend from bridge 130 opposite flanges 132 and 133. Extension 129 includes pivot hole 128. Extension 134 includes pivot hole 135. Pivot hole 135 is sized to engage pin 127. Pivot hole 128 is sized to engage pin 126. Rails 136 and 149 extend from opposite edges of bridge 130. Rail 136 includes tab 138 and slot 140. Rail 149 includes tab 148 and slot 141. Slot 145 is positioned between flanges 132 and 133 along an edge of bridge 130. Slot 146 is a generally rectangular shaped cut-out in bridge 130.

Figure 4:
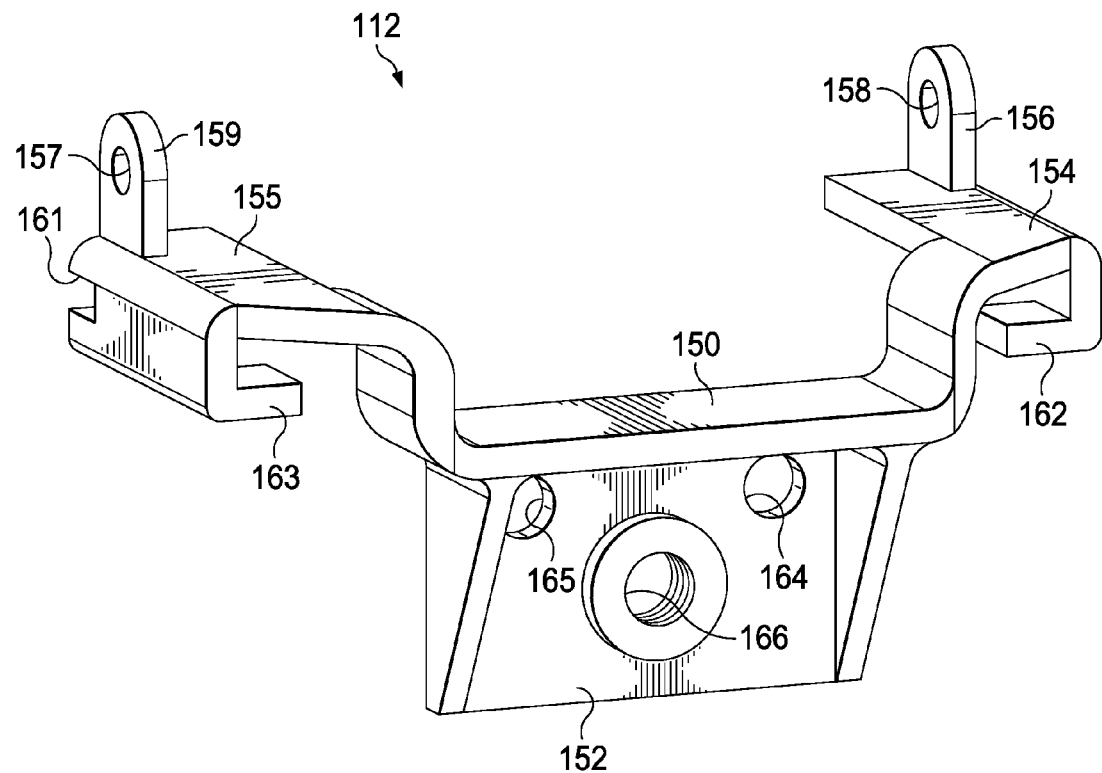
FIG. 4 is an isometric view of a dog of a preferred embodiment.

As shown in FIGS. 2A and 4, dog 112 is comprised of transverse portion 150 and jaw portion 152. Jaw portion 152 includes guide holes 164 and threaded hole 166. Threaded hole 166 is sized to engage the thumbscrew. Extending from transverse portion 150 are arms 154 and 155. Arm 154 includes slot 160, tab 162, and extension 156. Extension 156 includes pivot hole 158. Pivot hole 158 is sized to engage pin 124. Arm 154 is slidably engaged with rail 149. Slot 160 is sized to slidably engage tab 148. Tab 162 is sized to slidably engage slot 141. Arm 155 includes slot 161, tab 163 and extension 159. Extension 159 includes pivot hole 157. Pivot hole 157 is sized to engage pin 125. Arm 155 and is slidably engaged with rail 136. Slot 161 is sized to slidably engage tab 138. Tab 163 is sized to slidably engage slot 140.

Figure 5:
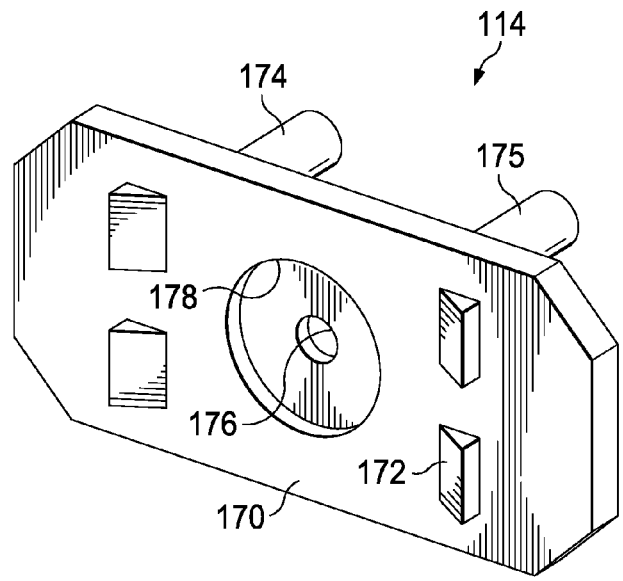
FIG. 5 is an isometric view of a pressure plate of a preferred embodiment.

Referring to FIGS. 2A and 5, pressure plate 114 is shown. Pressure plate 114 is generally rectangular and comprises face 170 and includes stanchions 174 and 175 extending from opposite sides. Stanchions 174 and 175 are sized to slidably engage guide holes 164 and 165. Pressure plate 114 further includes hole 176. Thumbscrew 120 engages hole 176 such that thumbscrew 120 is free to rotate with respect to pressure plate 114 while shoulder 121 abuts washer 101 adjacent pressure plate 114. Face 170 includes a recess space surrounding hole 168 to allow attachment of the thumbscrew to the pressure plate without the thumbscrew extending beyond the plane of face 170. Face 170 further includes opposing triangular cleats 172. In a preferred embodiment, cleats 172 are integrally formed with face 170. In an alternate embodiment, cleats 172 are comprised of flexible plastic or rubber materials and are affixed to face 170 with a suitable adhesive. In another embodiment, the face includes a knurled surface.

Figure 6:
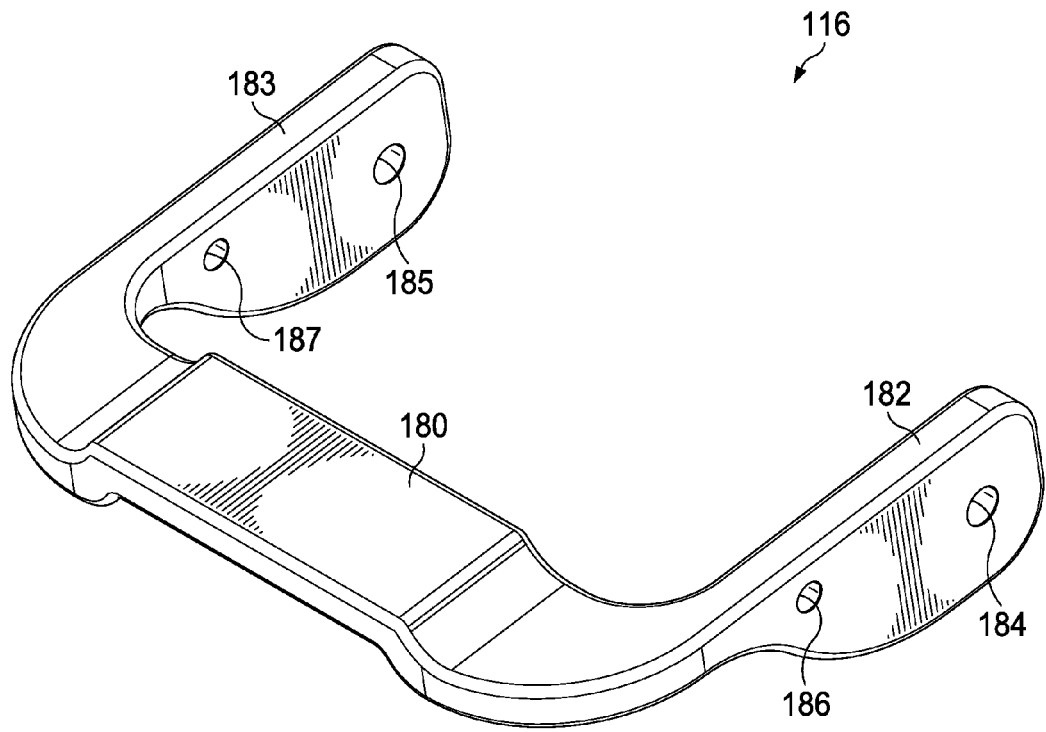
FIG. 6 is an isometric view of a lever of a preferred embodiment.

As shown in FIGS. 2A and 6, lever 116 comprises arms 182 and 183 extending from bridge 180. Arm 182 includes pivot hole 184 and pivot hole 186. Arm 183 includes pivot hole 185 and pivot hole 187. Pivot holes 184 and 185 are aligned with and sized to engage pins 126 and 127, respectively. Pivot holes 186 and 187 are aligned with and sized to engage pins 122 and 123, respectively. Lever 116 is pivotally connected to base 110 by pin 126 through pivot holes 184 and 128 and by pin 127 through pivot holes 185 and 135.

Figure 7A:
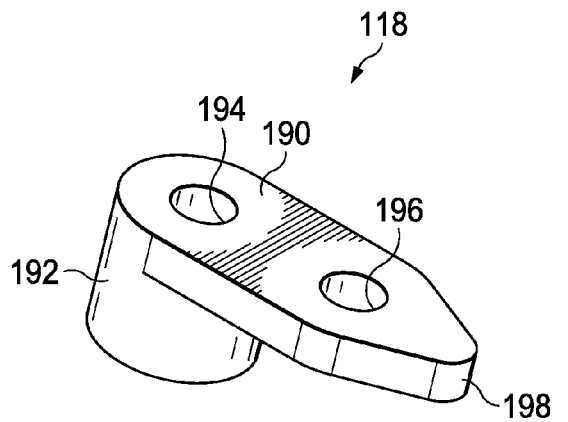
FIG. 7A is an isometric view of a link of a preferred embodiment.

Referring to FIGS. 4 and 7A, link 118 is shown. Link 118 comprises body 190 integrally formed with standoff 192. Standoff 192 is generally cylindrical and includes a centrally positioned pivot hole 194. Pivot hole 194 is sized to engage pin 122. Body 190 includes pivot hole 196. Pivot hole 196 is sized to engage pin 124. Body 190 forms stop surface 198. Lever 116 is pivotally connected to link 118 by pin 122 through pivot holes 194 and 186. Link 118 is pivotally connected to dog 112 by pin 124 through pivot holes 196 and 158.

Figure 7B:
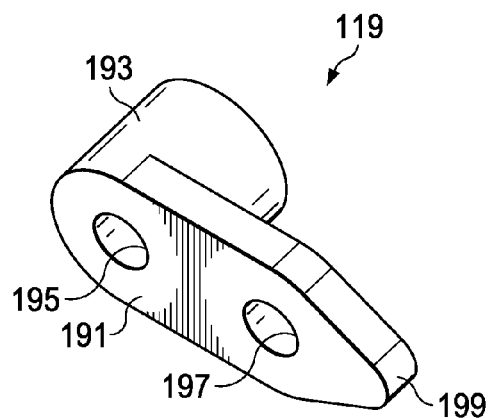
FIG. 7B is an isometric view of a link of a preferred embodiment.

Referring to FIGS. 4 and 7B, link 119 is shown. Link 119 comprises body 191 integrally formed with standoff 193. Standoff 193 is generally cylindrical and includes a centrally positioned pivot hole 195. Pivot hole 195 is sized to engage pin 123. Body 191 includes pivot hole 197. Pivot hole 197 is sized to engage pin 125. Body 191 forms stop surface 199. Lever 116 is pivotally connected to link 119 by pin 123 through pivot holes 195 and 187. Link 119 is pivotally connected to dog 112 by pin 125 through pivot holes 197 and 157.

Figure 8A:
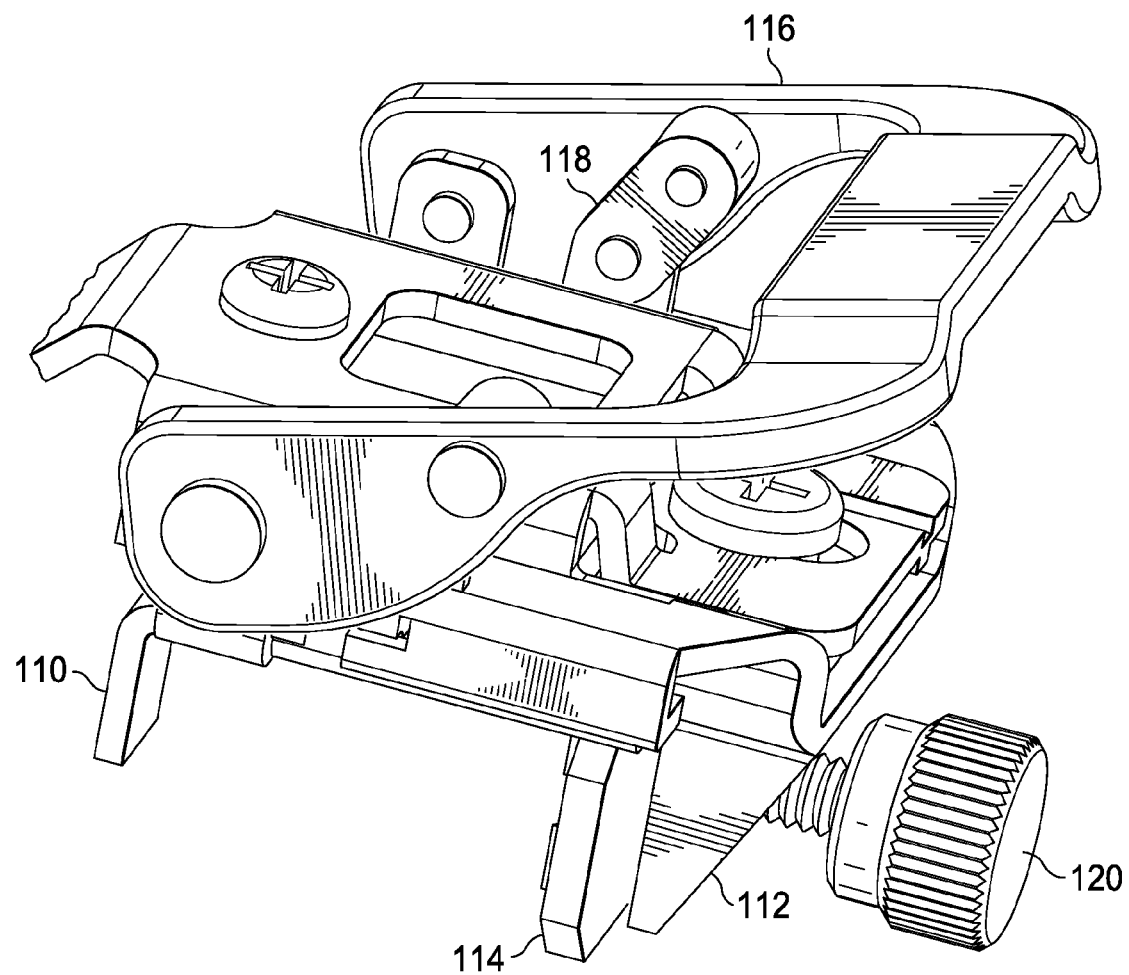
FIG. 8A is an isometric view of a preferred embodiment in an unlocked position.
Figure 8B:
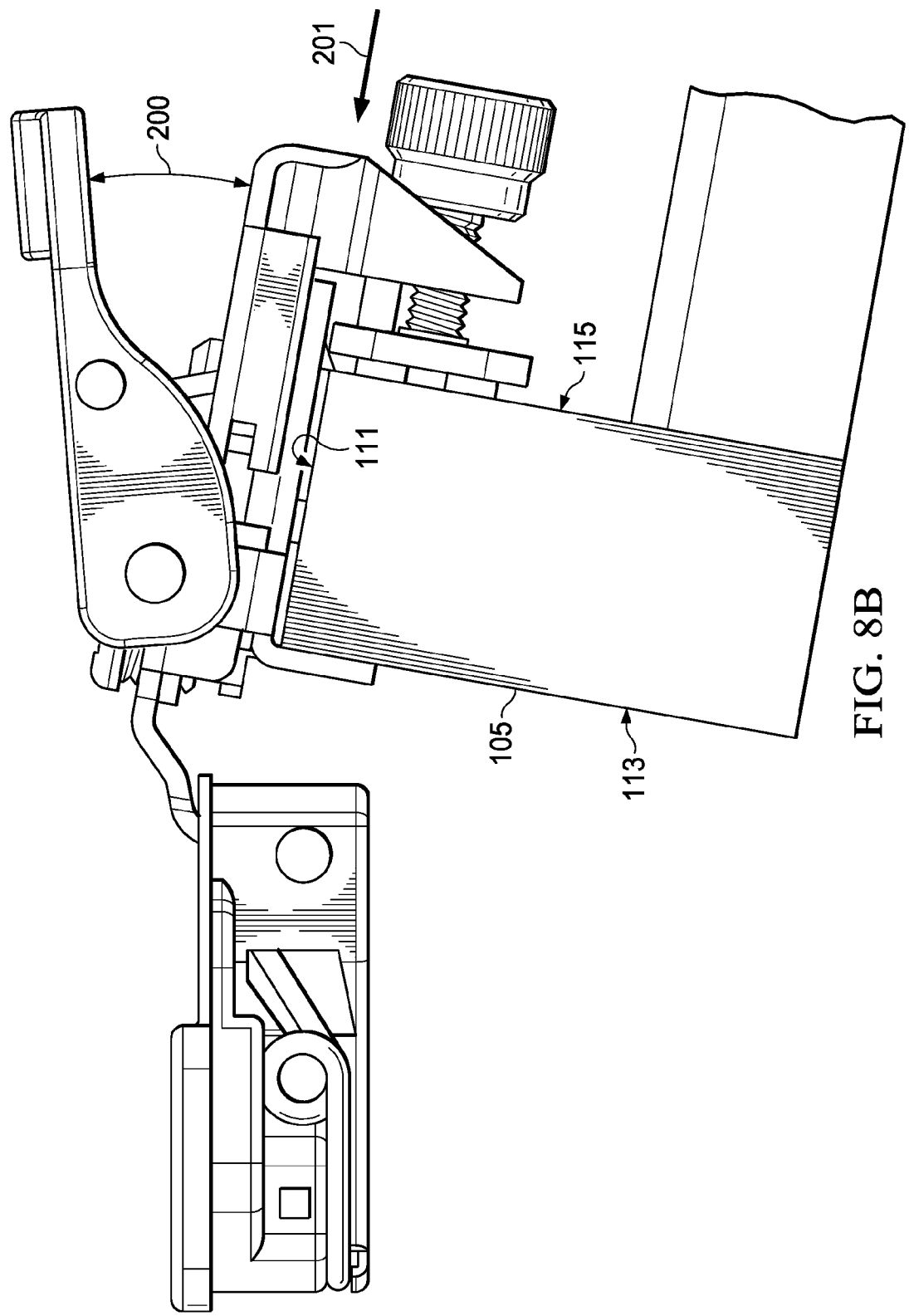
FIG. 8B is a plan view of a preferred embodiment in an unlocked position.
Figure 8C:
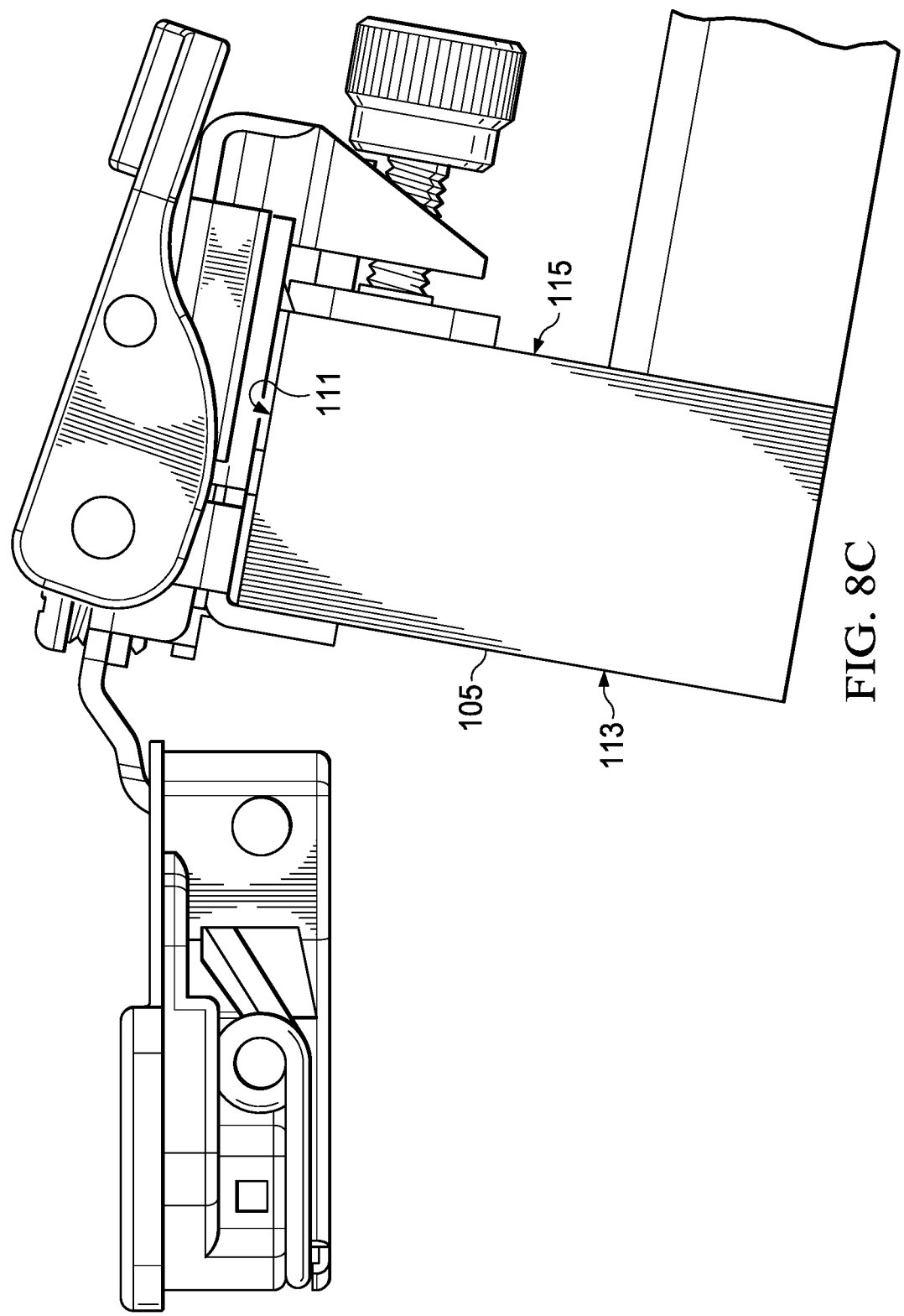
FIG. 8C is a plan view of a preferred embodiment in a locked position.

Referring to FIGS. 8A, 8B, and 8C, the preferred method of installing the hinge to the cabinet carcass will be described. FIGS. 8A and 8B show the hinge in an unlocked position. To install removable hinge 100, base 110 is positioned adjacent face 111 of cabinet carcass 105. Flanges 132 are positioned adjacent face 113 of cabinet carcass 105. Thumbscrew 120 is rotated and advances in direction 201 through threaded hole 166 thereby urging pressure plate 114 towards cabinet carcass 105 and away from jaw portion 152. Stanchions 174 and 175 similarly advance through guide holes 164 and 165. Thumbscrew 120 is advanced until cleats 172 abut face 115 of cabinet carcass 105. Lever 116 is pivoted in direction 200 toward base 110. As the lever pivots, links 118 and 119 pivot with respect to the lever and dog 112 thereby forcing dog 112 towards cabinet carcass 105. Arms 154 and 155 slide on rails 136 and 139, while tabs 138 and 148 engage slots 161 and 160 and tabs 163 and 162 engage slots 140 and 141. The engagement prevents torsional rotation of dog 112 relative to base 110. The lever in conjunction with the dog and links form a classic mechanical toggle which amplifies the compressive force applied to the pressure plate. As a result, cleats 172 are driven into face 115, clamping attachment mechanism 104 to cabinet carcass 105 in a locked position. Once in the locked position, minor vertical, horizontal, and lateral adjustments are made by rotating vertical adjustment cam A, horizontal adjustment cam C, and lateral adjustment screw B.

To release the hinge from the cabinet carcass, lever 116 is pivoted away from base 110, thereby urging dog 112 away from cabinet carcass 105. Thumbscrew 120 is reversed in threaded hole 166 causing cleats 172 to disengage from face 115. As a result, the hinge can be removed completely or quickly adjusted to an alternate location. As lever 116 is moved away from base 110, the stop surfaces provide a stop which abuts dog 112 and restricts rotational movement of the lever to prevent damage.

It will be appreciated by those skilled in the art that modifications can be made to the embodiments disclosed and remain within the inventive concept. Therefore, this invention is not limited to the specific embodiments disclosed, but is intended to cover changes within the scope and spirit of the claims.

The invention claimed is:

1. A removable attachment apparatus for mounting a hinge body to a furniture piece, the apparatus comprising:
   a base slidably engaged with a dog;
   a lever pivotally connected to the base and a toggle;
   the toggle further connected to the dog;
   wherein upon rotation of the lever in a first direction, the toggle urges the dog to move relative to the base creating a compressive force; and,
   wherein the base further comprises a generally flat body;
   a set of flanges extending from the flat body; and,
   a set of extensions pivotally connected to the lever.

2. The removable attachment apparatus of claim 1 wherein the toggle comprises a set of links.

3. The removable attachment apparatus of claim 2 wherein each link of the set of links further comprises:
   a stop surface configured to abut the dog upon rotation of the lever in a second direction.

4. A removable attachment apparatus for mounting a hinge body to a furniture piece, the apparatus comprising:
   a base slidably engaged with a dog;
   a lever pivotally connected to the base and a toggle;
   the toggle further connected to the dog;
   wherein upon rotation of the lever in a first direction, the toggle urges the dog to move relative to the base creating a compressive force; and,
   wherein the base further comprises a set of rails for slidable engagement with the dog;
   a set of slots formed in the set of rails for engagement with the dog; and,
   a set of tabs extending from the set of rails for engagement with the dog.

5. A removable attachment apparatus for mounting a hinge body to a furniture piece, the apparatus comprising:

a base slidably engaged with a dog;
a lever pivotally connected to the base and a toggle;
the toggle further connected to the dog;
wherein upon rotation of the lever in a first direction, the toggle urges the dog to move relative to the base creating a compressive force; and,
wherein the dog further comprises a jaw portion extending from a transverse portion;
a set of guide holes through the jaw portion; and,
a threaded hole through the jaw portion for engagement with a thumbscrew.

6. A removable attachment apparatus for mounting a hinge body to a furniture piece, the apparatus comprising:
a base slidably engaged with a dog;
a lever pivotally connected to the base and a toggle;
the toggle further connected to the dog;
wherein upon rotation of the lever in a first direction, the toggle urges the dog to move relative to the base creating a compressive force; and,
wherein the dog further comprises a set of arms for slidable engagement with the base;
a set of slots formed in the set of arms for engagement with the base; and,
a set of tabs formed in the set of arms for engagement with the base.

7. A removable attachment apparatus for mounting a hinge body to a furniture piece, the apparatus comprising:
a base slidably engaged with a dog;
a lever pivotally connected to the base and a toggle;
the toggle further connected to the dog;
wherein upon rotation of the lever in a first direction, the toggle urges the dog to move relative to the base creating a compressive force;
a pressure plate slidingly engaged with the dog;
wherein upon rotation of the lever in the first direction, the pressure plate moves relative to the base creating the compressive force; and,
a thumbscrew adjustably engaged with the dog and connected to the pressure plate.

8. A removable attachment apparatus for mounting a hinge body to a furniture piece, the apparatus comprising:
a base slidably engaged with a dog;
a lever pivotally connected to the base and a toggle;
the toggle further connected to the dog;
wherein upon rotation of the lever in a first direction, the toggle urges the dog to move relative to the base creating a compressive force;
a pressure plate slidingly engaged with the dog;
a thumbscrew threadably engaged with the dog and connected to the pressure plate;
a shoulder, formed in the thumbscrew, configured to abut the pressure plate; and,
wherein rotation of the thumbscrew advances the thumbscrew through the dog and the shoulder urges the pressure plate.

9. A removable compact hinge apparatus for pivotally connecting a swinging door to a cabinet carcass, the apparatus comprising:
a hinge cup configured to be affixed to the door;
a hinge arm pivotally connected to the hinge cup and adjustably connected to a base;
the base pivotally connected to a lever at a first pivot point;
a dog slidingly engaged to the base and pivotally connected to a set of links at a second pivot point;
the set of links pivotally connected to the lever at a third pivot point;
a pressure plate adjustably connected to the dog; and,
wherein the dog is configured to slide along the base upon rotation of the lever about the first pivot point.

10. The removable compact hinge apparatus of claim 9 wherein the base further comprises:
a flat body;
a set of flanges extending from the flat body; and,
a set of extensions pivotally connected to the lever.

11. The removable compact hinge apparatus of claim 9 wherein the base further comprises:
a set of rails for slidable engagement with the dog;
a set of slots formed in the set of rails for releasable engagement with the dog; and,
a set of tabs extending from the set of rails for releasable engagement with the dog.

12. The removable compact hinge apparatus of claim 9 wherein the dog further comprises:
a jaw portion extending from a transverse portion;
a set of guide holes through the jaw portion for slidable engagement with the pressure plate; and,
a threaded hole through the jaw portion engaged with a thumbscrew.

13. The removable compact hinge apparatus of claim 9 wherein the dog further comprises:
a set of arms for slidable engagement with the base;
a set of slots formed in the set of arms for releasable engagement with the base; and,
a set of tabs formed in the set of arms for releasable engagement with the base.

14. The removable compact hinge apparatus of claim 9 further comprising:
a thumbscrew threadably engaged with the dog and rotatably connected to the pressure plate;
a shoulder, formed in the thumbscrew, configured to abut the pressure plate; and,
wherein upon rotation of the thumbscrew, the shoulder urges the pressure plate.

15. The removable compact hinge apparatus of claim 9 further comprising:
a vertical adjustment cam comprising an offset cam extension extending from a cam shoulder;
an adjustment plate slidingly engaged with the base;
a follower hole in the adjustment plate and engaged with the cam shoulder;
a pivot hole in the base and engaged with the offset cam extension; and,
wherein upon rotation of the vertical adjustment cam, the cam shoulder urges the adjustment plate and the hinge arm to move in a vertical direction relative to the base.

16. The removable compact hinge apparatus of claim 9 further comprising:
a lateral adjustment screw comprising a head extending from a threaded section;
an adjustment plate connected to the base;
a slot in the adjustment plate engaged with the head;
the threaded section engaged with a threaded hole in the hinge arm; and,
wherein upon rotation of the lateral adjustment screw, the head urges the hinge arm to move in a lateral direction relative to the adjustment plate.

17. The removable compact hinge apparatus of claim 9 further comprising:
a horizontal adjustment cam comprising an offset cam extension extending from a cam shoulder;
an adjustment plate slidingly engaged with the hinge arm;
a follower hole in the hinge arm and engaged with the cam shoulder;

a pivot hole in the adjustment plate and engaged with the offset cam extension; and, wherein upon rotation of the horizontal adjustment cam, the cam shoulder urges the hinge arm to move in a horizontal direction relative to the adjustment plate.

18. A method for removably attaching a compact hinge to a furniture piece, the method comprising:

provicing a base adjustably connected to the compact hinge and slidingly engaged with a dog, a lever pivotally connected to the base and a set of links, the set of links pivotally connected to the dog, and a pressure plate adjustably connected to the dog by a thumbscrew;

pivoting the lever away from the base;

positioning the base adjacent the furniture piece;

rotating the thumbscrew to advance the thumbscrew towards the furniture piece;

abutting the pressure plate against the furniture piece; and, pivoting the lever towards the base.

19. The method of removably attaching a compact hinge to a furniture piece of claim 18 wherein the step of positioning the base further comprises:

positioning the base adjacent a first face of the furniture piece; and, positioning a set of flanges extending from the base adjacent a second face of the furniture piece.

20. The method of removably attaching a compact hinge to a furniture piece of claim 18 wherein the step of rotating the thumbscrew further comprises:

urging the pressure plate towards the furniture piece.

21. The method of removably attaching a compact hinge to a furniture piece of claim 18 wherein the step of pivoting the lever towards the base further comprises:

pivoting the set of links;

forcing the dog towards the furniture piece; and, creating a compressive force between the base and the dog.

* * * * *